United States Patent [19]

Sutton et al.

[11] 4,079,494

[45] Mar. 21, 1978

[54] SINGLE LEVER FAUCET CARTRIDGE EXTRACTING TOOL

[76] Inventors: George Sutton; William H. Ense, both of 2605 NE. 9th Ave., Wilton Manors, Fla. 33334

[21] Appl. No.: 791,483

[22] Filed: Apr. 27, 1977

[51] Int. Cl.² .............................................. B23P 19/04

[52] U.S. Cl. ...................................... 29/280; 137/327

[58] Field of Search ................. 29/213, 258, 264, 278, 29/280, 281, 282; 137/327

[56] References Cited

U.S. PATENT DOCUMENTS

| | | | |
|---|---|---|---|
| 2,487,331 | 11/1949 | Greene | 29/281 X |
| 2,649,825 | 8/1953 | Fisher | 29/213 X |
| 2,951,282 | 9/1960 | Albright | 29/281 X |
| 3,961,410 | 6/1976 | Reed | 29/282 X |
| 4,009,515 | 3/1977 | Racin | 29/280 X |

*Primary Examiner*—Jimmy C. Peters

[57] ABSTRACT

A tool for extracting a cartridge from a single lever faucet including an elongated threaded shank threadedly connected to the faucet cartridge. The shank extends axially along the interior of a sleeve placed in surrounding relation to the cartridge. A handle element on the shank held captive by a head on the shank is used to pull the cartridge from a faucet construction into the interior of the sleeve of the tool once the shank is threadedly connected to the cartridge.

3 Claims, 3 Drawing Figures

SINGLE LEVER FAUCET CARTRIDGE EXTRACTING TOOL

PRIOR ART

The following patents are considered pertinent:

U.S. Pat. No. 2,716,421
U.S. Pat. No. 3,111,961
U.S. Pat. No. 3,572,369
U.S. Pat. No. 3,583,416
U.S. Pat. No. 3,644,982

BACKGROUND OF THE INVENTION

This invention relates to a tool, and more particularly, a special tool for extracting a single lever faucet cartridge.

Many faucet constructions are provided with a single cartridge which includes a plurality of valve elements for controlling the mixture of hot and cold water dispensed from the faucet and the amount of water that is dispensed. The cartridge is slidably disposed in the faucet construction and usually mounts a rotatable lever on a pin threadedly connected to the cartridge, which is connected to a handle. This invention provides a tool for facilitating the removal and replacement of such cartridges.

SUMMARY OF THE INVENTION

In accordance with the invention, the tool includes a sleeve adapted to be disposed about a portion of the cartridge. The sleeve includes an eye bolt slidable through a handle element. Mounted on a threaded shank of the eye bolt is a nut. The eye bolt is threaded into the pin receiving socket of the cartridge until the nut abuts the outer surface of the cartridge. The handle is then slid into contact with the eye bolt head to pull the eye bolt and the cartridge upwardly relative to the sleeve to remove the cartridge from the faucet construction.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
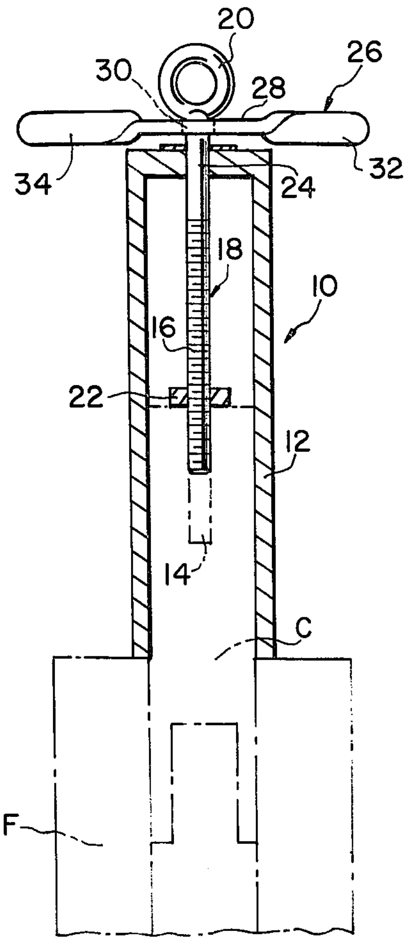
FIG. 1 is a longitudinal cross-sectional view through the tool of the present invention illustrated as being applied to a single lever faucet cartridge to extract the cartridge from a faucet construction.

Referring now to the drawing in detail, wherein like numerals indicate like elements throughout the several views, the tool 10 of the present invention includes an elongated sleeve 12 adapted to fit over a single lever faucet cartridge C slidably disposed in a faucet construction F.

A lever pin threadedly connected to a bore 14 in the cartridge C is removed and a threaded shank 16 of an eye bolt 18 having a head 20 is threadedly inserted in the bore 14. A nut 22 is threaded onto the shank 16 and will limit the movement of shank 16 into bore 14.

Eye bolt 18 is slidable within a bore 24 in the top of sleeve 12 which is of slightly greater diameter than the diameter of threaded shank 16. Disposed on shank 16 beneath eye bolt head 20 is a handle element 26 having a flat, horizontal central portion 28 provided with an elongated bore 30 therethrough receiving the shank 16 of eye bolt 18.

Figure 2:
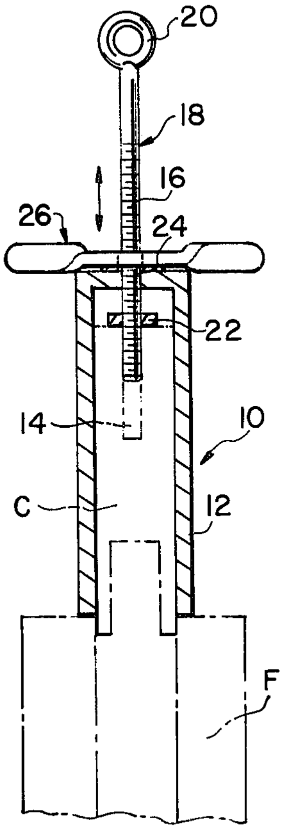
FIG. 2 is a view similar to FIG. 1 but illustrating the cartridge extracted from the faucet construction.
Figure 3:
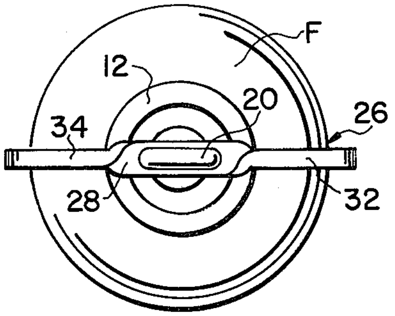
FIG. 3 is a top plan view of the tool of FIG. 1.

In use, with threaded shank 16 secured to threaded bore 14 of cartridge C, as illustrated in FIG. 1, handle 28 having vertical portions 32 and 34 extending from opposite sides of horizontal portion 28 is pulled upwardly until it abuts the head 20 of eye bolt 18 pulling shank 16 through bore 24 and sleeve 12 and sliding cartridge C upwardly in the interior of sleeve 12 from faucet F until it substantially clears the faucet construction F as shown in FIG. 2. Whereupon, the eye bolt 20 can be unthreaded from bore 14 and sleeve 12 removed from cartridge C which then can be grasped and removed from the faucet construction F.

While a specific embodiment of a single lever faucet cartridge extracting tool has been disclosed in the foregoing description, it will be understood that various modifications within the spirit of the invention may occur to those skilled in the art. Therefore, it is intended that no limitations be placed on the invention except as defined by the scope of the appended claims.

We claim:

1. A tool for extracting a cartridge from a single lever faucet construction, said cartridge having a threaded bore comprising:

a sleeve slidably disposed about said cartridge, an eye bolt having a threaded shank slidable along the axis of said sleeve within the interior of said sleeve through an opening in one end of said sleeve, a nut adjustably positioned on said threaded shank, whereby said threaded shank may be threadedly connected to the threaded bore in said cartridge, a handle element slidably received on the shank of said eye bolt between a head of said eye bolt and said threaded shank portion, whereby after threadedly connecting said bolt to said cartridge said handle may engage the head of said eye bolt to pull said shank and said cartridge from said faucet construction into said sleeve.

2. The tool of claim 1 wherein said handle element includes a substantially planar horizontal central portion having an opening therethrough receiving the shank of said eye bolt, said opening being of smaller lateral extent than the width of the head of said eye bolt.

3. The tool of claim 2 wherein said handle element includes a substantially vertical wing portion connected to opposite ends of said horizontal portion.

* * * * *